United States Patent [19]

Houston

[11] 4,047,040

[45] Sept. 6, 1977

[54] GRIDDED IONIZATION CHAMBER

[75] Inventor: John M. Houston, Schenectady, N.Y.

[73] Assignee: General Electric Company, Schenectady, N.Y.

[21] Appl. No.: 683,908

[22] Filed: May 6, 1976

[51] Int. Cl.[2] .................................... G01T 1/18

[52] U.S. Cl. .................................... 250/385; 250/389

[58] Field of Search .................................... 250/385, 389

[56] References Cited

U.S. PATENT DOCUMENTS

| | | | |
|---|---|---|---|
| 2,741,709 | 4/1956 | Tirico et al. | 250/385 |
| 3,373,283 | 3/1968 | Lansiart et al. | 250/389 |
| 3,676,682 | 7/1972 | Falk | 250/385 |
| 3,836,780 | 9/1974 | Amquist et al. | 250/385 |
| 3,898,465 | 8/1975 | Zaklad et al. | 250/389 |

*Primary Examiner*—Archie R. Borchelt

*Attorney, Agent, or Firm*—Jack E. Haken; Joseph T. Cohen; Jerome C. Squillaro

[57] ABSTRACT

An improved ionization chamber type x-ray detector comprises a heavy gas at high pressure disposed between an anode and a cathode. An open grid structure is disposed adjacent the anode and is maintained at a voltage intermediate between the cathode and anode potentials. The electric field which is produced by positive ions drifting toward the cathode is thus shielded from the anode. Current measuring circuits connected to the anode are, therefore, responsive only to electron current flow within the chamber and the recovery time of the chamber is shortened.

The grid structure also serves to shield the anode from electrical currents which might otherwise be induced by mechanical vibrations in the ionization chamber structure.

10 Claims, 5 Drawing Figures

GRIDDED IONIZATION CHAMBER

This invention relates to ionization chamber x-ray detectors. More specifically, this invention relates to high speed ionization chambers which comprise a shielding grid electrode.

BACKGROUND OF THE INVENTION

Ionization chambers are commonly used for detecting x-ray photons and other ionizing radiation. X-ray photons will interact with atoms of a heavy detector gas to produce electron-ion pairs. The x-ray photons are, generally, absorbed by a gas atom which emits a photoelectron from one of its electronic levels. The photoelectrons move through the gas, interacting with and ionizing other gas atoms, to produce a shower of electrons and positive ions which may be collected on suitable electrodes to produce an electric current flow. If such electron-ion pairs are produced in a region between two electrodes of opposite polarity, they will drift along electric field lines to the electrodes and will yield an electric current. The electric current flow between the electrodes is a function of the total number of x-ray photons interacting in the vicinity of those electrodes.

The probability of detection of an x-ray photon is a function of the atomic weight of the gas and of the number of gas atoms lying between the collector electrode. Thus, high sensitivity detectors may be constructed from a gas of high atomic weight at a relatively high pressure. Detector sensitivity may also be increased by increasing the spacing, and therefore the number of gas molecules, between the electrodes. Increased electrode spacing, however, increases the distance which the electron-ion pairs drift for collection and thus tends to increase the recovery time of the detector. An increased electric field gradient between the electrodes will tend to increase the ion drift velocity and thus somewhat shorten the recovery time of the detector. However, one is limited in the electric gradient increase which it is feasible to use, since avalanche gas gain will begin to occur, causing gain uncertainty and, eventually, gas breakdown. Also increasing detector voltage causes undesirable increases in detector microphonic sensitivity.

Arrays of ionization chambers are typically used to measure x-ray intensity distributions in computerized transverse axial tomography equipment. In a typical application of such equipment, a moving x-ray source is repeatedly pulsed to transmit x-ray energy along a plurality of distinct ray paths through a body undergoing examination. Energy transmitted through the body is detected in an ionization chamber array and interpreted, by use of a digital computer, to produce x-ray images of internal body structures. My copending patent application with Nathan R. Whetten, Ser. No. 616,930, filed Sept. 26, 1975, describes an array of ionization chambers which may be effectively utilized in computerized transverse axial tomography equipment. That disclosure is incorporated by reference herein, as background material.

The data collection rate in computerized tomography equipment incorporating ionzation chamber detector arrays is limited by the recovery time of the individual detector cells. The time between x-ray pulses must be sufficiently long to allow collection of substantially all of the charged particles within the detector cells.

The electrons produced in ionization chambers are known to drift very rapidly to the anode while the positive ions move much more slowly to the cathode. In general, the electron current cannot, however, be independently measured in prior art ionization chambers since it is masked by a displacement current which is generated in the anode circuit by the positive ions flowing away from the anode.

There is, however, one exception to the preceding statement. A simple two-electrode ionization chamber can detect independently the electron component if the x-ray pulse is very short as compared to the ion drift time. In that case, the electron component stands out as an intense short pulse above the slowly-changing ion displacement current. However, in most computerized tomography x-ray equipment, it is not feasible to achieve a sufficient x-ray flux level if the x-ray pulse is short in comparison to the ion drift time even at the maximum current now achievable in conventional x-ray tubes. Instead, in present-day computerized tomography systems, it is necessary to use an x-ray pulse which is comparable in length to the ion drift time (typically a few milliseconds). In such case, there is no way to separately measure the electron current component in prior-art ionization chambers.

Such prior art ionization chambers are described, for example, in *Ionization Chambers and Counters Experimental Techniques,* B. B. Rossi and H. H. Staub, McGraw-Hill 1949, at Chapter 5 which text is incorporated herein as background material.

Mechanical vibrations which may be transmitted to the electrodes of prior art ionization chambers vary the electrode spacing and capacitance and thus tend to introduce microphonic error currents into the detector circuit. The electrical noise produced by these microphonic currents may necessitate the use of an increased radiation exposure in order to produce tomographic images of a given resolution.

SUMMARY OF THE INVENTION

A grid electrode is disposed in the detector region of an ionization chamber adjacent the anode and is maintained at an electric potential between that of the anode and the cathode. The grid acts to shield the anode from the electric field which is produced by positive ions which flow toward the cathode and thus permits an independent measurement of the electron current flowing to the anode; even when x-ray pulse length is not much shorter than the ion drift time. The recovery time of the ionization chamber is thereby decreased by several orders of magnitude over prior art chambers. The grid may be rigidly fixed to the anode and, by shielding the anode from the cathode electric field, will tend to eliminate capacitive microphonic currents which would otherwise flow in the anode circuit.

It is, therefore, an object of this invention to provide structures for substantially decreasing the recovery time of ionization chamber x-ray detectors.

Another object of this invention is to provide shielding structures for ionization chambers which tend to decrease the effects of microphonic error currents.

BRIEF DESCRIPTION OF THE DRAWINGS

The novel features believed characteristic of the present invention are set forth in the appended claims. The invention itself, together with further objects and advantages thereof, may best be understood by reference to the following detail description, taken in connection with the appended drawings in which:

DESCRIPTION OF THE PREFERRED EMBODIMENT

Figure 1:
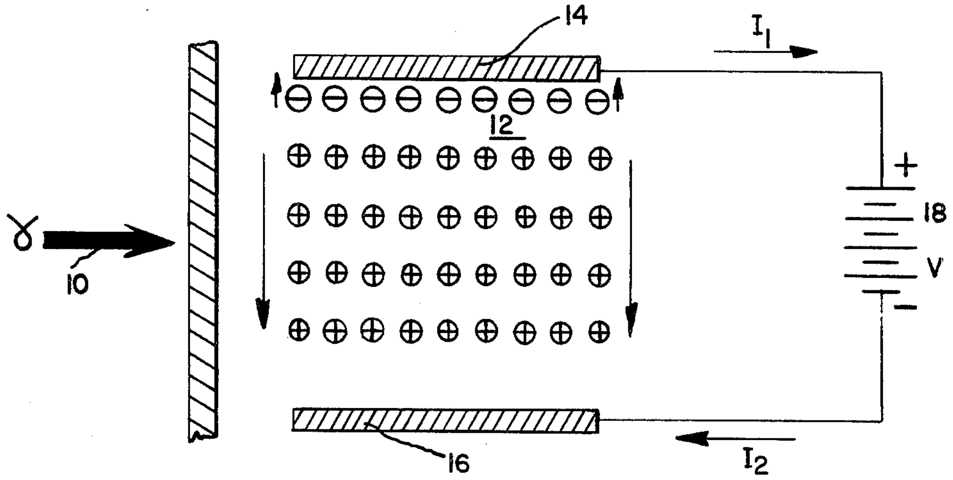
Fig.1 PRIOR ART
FIG. 1 is an ionization chamber x-ray detector of the prior art.

FIG. 1 is a single cell of an ionization chamber x-ray detector of the prior art. X-ray photons 10 interact with atoms of a heavy gas 12 in the region between a planar anode 14 and a parallel planar cathode 16. A voltage source 18 is connected between the anode 14 and the cathode 16 to induce an electric field in the region between them.

An x-ray photon which is absorbed in the gas 12, typically produces a photoelectron which in turn produces a number of electron-ion pairs in the gas. The electrons drift rapidly to the anode 14 (typically in about 1 microsecond) while the ions drift much more slowly to the cathode 16 (typically in a few milliseconds). The current $I_1$ flowing from the anode 14 into the voltage source 18 must, necessarily, equal the current $I_2$ flowing from the voltage source to the cathode 16 and is determined by the flow of positive ions to the cathode. The rapid electron current flow to the anode 14 is superimposed on an approximately-equal and opposite displacement current which is induced when positive ions move from the region of the anode to the region of the cathode. Thus, even though no ions flow to the anode, the current from that electrode still exhibits a relatively slow response which is controlled by the slow positive ion motion, i.e., following the termination of the x-ray pulse, the displacement current in the anode continues to flow (typically for a few milliseconds) until all the ions reach the cathode.

Figure 2:
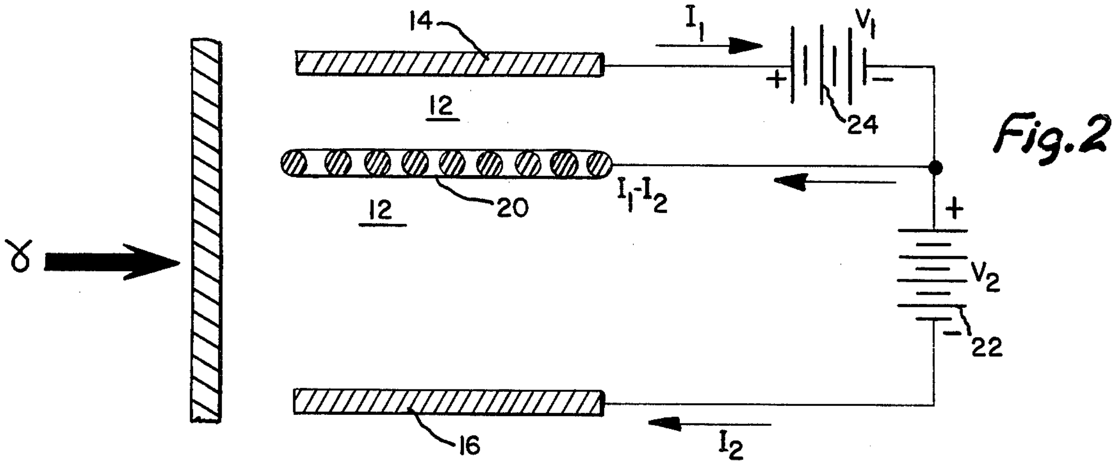
FIG. 2 is an ionization chamber x-ray detector of the present invention.

FIG. 2 is an improved ionization chamber of the present invention. A heavy detector gas 12 occupies the region between an anode 14 and a cathode 16. An open grid electrode 20 is disposed in the gas 12 adjacent and parallel the anode 14. The grid electrode 20 is maintained at a voltage intermediate between the cathode 16 and the anode 14 by voltage sources 22 and 24. X-ray photons enter the detector and interact with the gas 12 to create electron-ion pairs in the region between the cathode 16 and the grid 20. The electrons drift rapidly toward the grid while the ions drift slowly toward the cathode. Some of the electrons are collected on the grid. However, a fraction of the electrons (e.g., perhaps one-half) pass through the grid and reach the anode. The number of electrons which reach the anode can be enhanced by adjusting the voltage $V_2$ of voltage source 22 and $V_1$ of voltage source 24 so that the electric field between the grid and the anode is larger than the electric field between the grid and the cathode.

The detector gas 12 should, advantageously, be a gas having an atomic weight greater than or equal to the atomic weight of argon and may, typically comprise xenon or a mixture of rare gases at a pressure between approximately 10 atmospheres and approximately 100 atmospheres.

The displacement current due to ion motion between the cathode 16 and the grid 20 flows to the grid, since the anode 14 is now electrostatically shielded from the slowly changing ion charge in that region. The current flowing from the anode 14, $I_1$ will only be due to the electron flow, and will exhibit a response time of the order of 1 microsecond, which is roughly one thousand times faster than a response time determined by ion drift.

Figure 3:
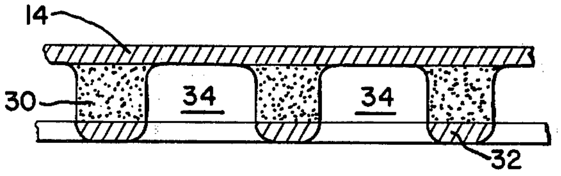
FIG. 3 is a sectional view of a grid structure of the present invention.

FIG. 3 is a grid structure which may be advantageously incorporated in ion chambers of the present invention. A thin uniform layer insulating material, for example, alumina, quartz, or boron nitride 30 is deposited on the surface of a metallic anode 14. A thin layer of metal 32 is deposited on the insulating layer 30 opposite the anode. Holes 34 are then etched or sandblasted through the thin metal layer 32 and the insulating layer 30 to form an insulated grid which is directly bonded to the anode. Similar techniques for forming directly bonded grids have been developed for use in ceramic-metal electron tubes. In the present application, however, the insulating layer between the grid 32 and the anode 14 must have a high electrical resistance, typically $10^{12}$ ohms or more in order to minimize electrical leakage from the grid 32 to the anode 14.

The directly bonded grid of FIG. 3 will, further, act to shield the anode 14 from any changing electric field which might be caused by the vibration of the anode or adjacent electrodes. Detectors of the present construction will, therefore, tend to generate far smaller microphonic currents than did detectors of the prior art.

Figure 4:
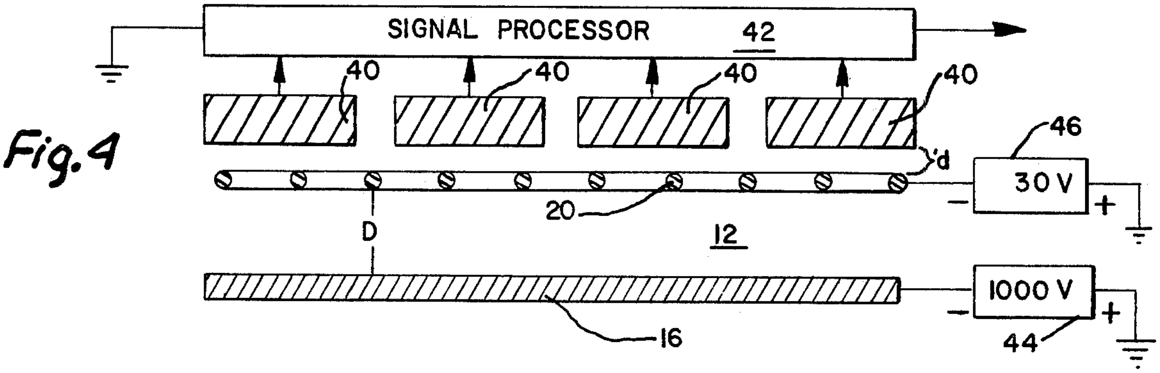
FIG. 4 is an ionization chamber array of the present invention.

FIG. 4 is an ionization chamber array for determining the spatial distribution of x-ray intensity. A grid structure 20 is disposed parallel to a planar cathode 16. A plurality of anode segments 40 are disposed adjacent the grid opposite the cathode 16. A detector gas 12 occupies the region between the cathode 16, the grid 20, and the anodes 40. Each of the individual anodes 40 is connected to ground through a signal processor circuit 42 which comprises means for measuring and quantifying the current flow from each anode segment. The cathode 16 is maintained at a negative voltage, with respect to ground, by a first voltage source 44. The grid 20 is maintained at a voltage intermediate that of the cathode and ground by a second voltage source 46. For grid-to-cathode spacing D of approximately 10 millimeters and a grid-to-anode spacing *d* of approximately 0.1 millimeter, the cathode is advantageously maintained at approximately 1000 volts below ground potential and the grid at approximately 30 volts below ground potential. However, the electron drift velocity varies only slightly with electric field and a wide range of other voltages are possible. The electric field in the detector should, in any case, be maintained below those values which would produce an avalanche breakdown in the detector gas 12 and thus cause a highly nonlinear response.

Figure 5:
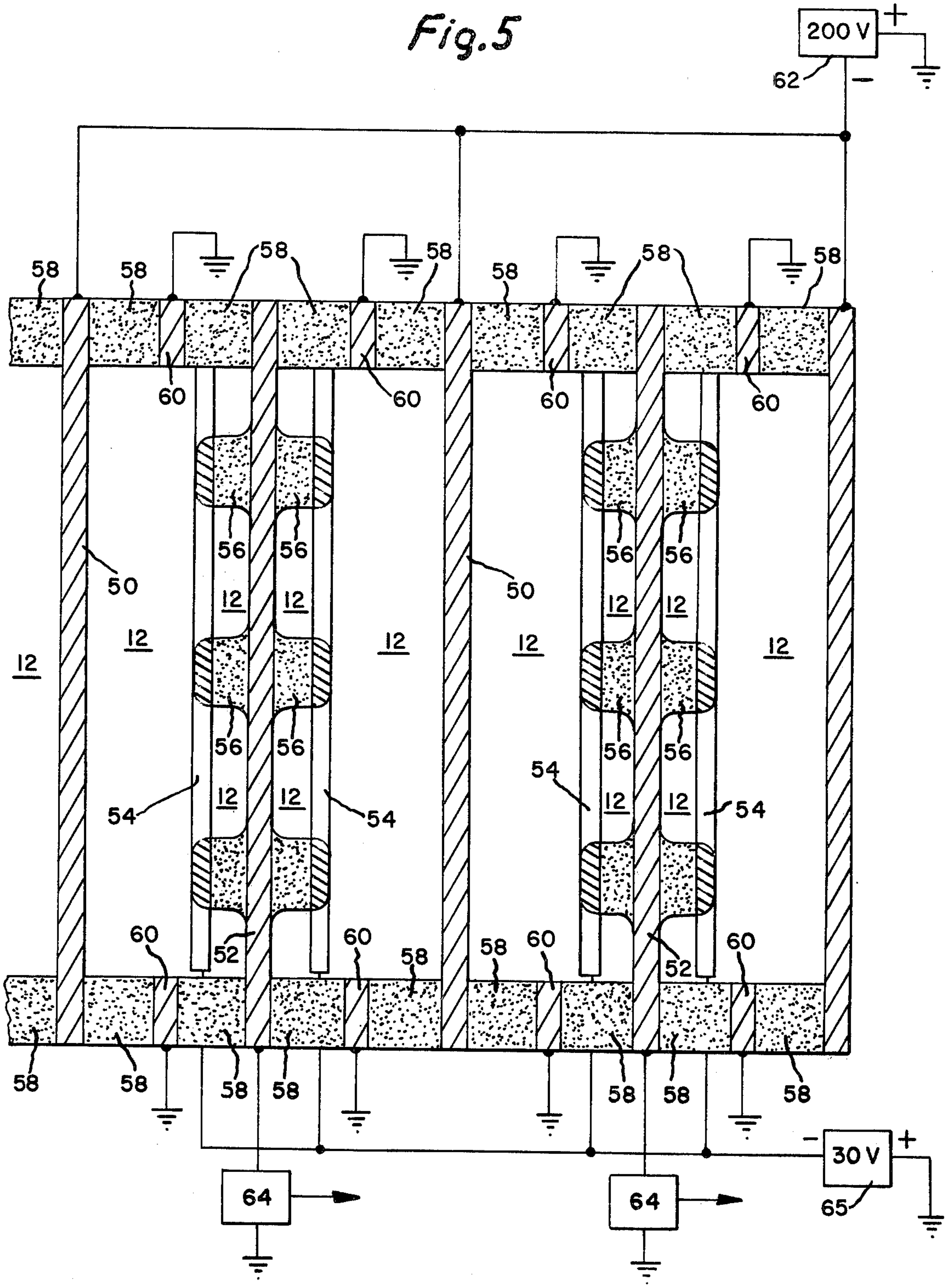
FIG. 5 is an alternate embodiment of an ionization chamber array of the present invention.

The detector embodiment of FIG. 4 provides extremely short recovery times. The spatial resolution of that detector is, however, limited by xenon characteristic radiation which tends to produce crosstalk between the output signals from adjacent anode segments 40 . FIG. 5 is an embodiment of the present invention which is less sensitive to the crosstalk produced by xenon characteristic radiation than is the detector of FIG. 4. This embodiment comprises a plurality of substantially parallel cathode plates 50 separated and supported by insulators 58. A plurality of anode plates 52 are disposed equi-distant between the cathode plates 50 and likewise supported by insulators 58. Grounded guard rings 60 may be inserted in the insulators 58 between the cathode plates 50 and the anode plates 52 to drain leakage currents which might otherwise flow along the insulators and produce errors in radiation measurements. The cathode plates 50 are maintained a negative voltage with respect to ground by a voltage supply 62. The anodes 52 are connected to ground through current measuring circuits 64. A pair of conductive grids 54 are disposed adjacent the surfaces of each anode plate 52. The grids may be supported on a thin layer (e.g., 0.1 mm) of insulating material 56 on the surface of the anodes, in a manner described above with reference to FIG. 3. The grid structures are maintained at a voltage intermediate between that of the cathodes and ground by a voltage supply 65.

The anode plates 50 and the cathode plates 52 should, advantageously, be fabricated from metals of high atomic number, for example, molybdenum, tantalum, or tungsten. By way of illustration only, in a typical detector the anode and cathode plates may be constructed from 0.05 millimeter molybdenum or tungsten sheets mounted on 2 millimeter centers. The anode and cathode sheets serve to shield individual detector cells from xenon characteristic radiation which is produced in adjacent cells in a manner more particularly described in the above-referenced, copending patent disclosure. In a typical cell, the cathodes 50 may be maintained at a voltage approximately 200 volts below ground and the grids 54 maintained at a voltage approximately 30 volts below ground potential.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An ionization chamber x-ray detector comprising:

a substantially flat anode sheet;

a substantially flat cathode sheet disposed parallel said anode sheet;

a perforated insulating layer disposed on the surface of said anode sheet;

an open grid comprising a thin, perforated metal sheet disposed on said insulating layer, the perforations of said insulating layer and metallic sheet being aligned;

a gaseous detecting medium disposed between said cathode, said anode, and said grid;

means for maintaining an electrical potential between said anode and said cathode;

means for maintaining said grid at an electrical potential intermediate that of said anode and said cathode; and means for measuring current flow from said anode to said cathode.

2. The ionization chamber of claim 1 wherein said insulating layer comprises materials selected from the group consisting of alumina, quartz, and boron nitride.

3. The ionization chamber of claim 1 wherein said gaseous medium comprises gases having an atomic weight greater than or equal to the atomic weight of argon.

4. The ionization chamber of claim 3 wherein gaseous medium comprises xenon.

5. The ionization chamber of claim 1 wherein said gaseous medium has a pressure between approximately 10 atmospheres and approximately 100 atmospheres.

6. The ionization chamber of claim 1 wherein the electric field strength between said grid and said anode is substantially greater than the electric field strength between said grid and said cathode.

7. The ionization chamber of claim 1 wherein said anode sheet comprises a plurality of conductive segments, electrically insulated one from the other and wherein said current measuring means is adapted to measure individual current flow from each of said segments.

8. An improved ionization chamber x-ray detector array of the type comprising a gaseous detector medium, a plurality of substantially planar anodes disposed in said gaseous medium, a plurality of planar cathodes disposed in said gaseous medium, each of said cathodes lying approximately equi-distant between two of said anodes, and means for applying direct current electric potential between said cathodes and said anodes; wherein, as an improvement, said ionization chamber array further comprises:

a plurality of open grid structures disposed adjacent the surfaces of said anodes;

a plurality of thin perforated insulating layers separating each of said anodes and grids; and means for maintaining said grid structures at a potential intermediate that of said cathodes and said anodes.

9. The ionization chamber array of claim 8 wherein each of said grids are attached to an insulating layer, and said insulating layers are attached to said anodes.

10. The ionization chamber of claim 8 wherein the electric field produced between said grids and said anodes is substantially larger than the electric field produced between said grids and said cathodes.

* * * * *